(12) United States Patent
Higbie (10) Patent No.: US 10,248,717 B2
(45) Date of Patent: Apr. 2, 2019

(54) COMPUTER-BASED MEDIA CONTENT CLASSIFICATION AND DISCOVERY SYSTEM AND RELATED METHODS

(71) Applicant: Colin Laird Higbie, Orange, NH (US)

(72) Inventor: Colin Laird Higbie, Orange, NH (US)

( * ) Notice: Subject to any disclaimer, the term of this patent is extended or adjusted under 35 U.S.C. 154(b) by 589 days.

(21) Appl. No.: 14/616,124

(22) Filed: Feb. 6, 2015

(65) Prior Publication Data

US 2015/0227621 A1 Aug. 13, 2015

Related U.S. Application Data

(60) Provisional application No. 61/937,487, filed on Feb. 8, 2014.

(51) Int. Cl.
*G06F 17/30* (2006.01)
(52) U.S. Cl.
CPC .. *G06F 17/30713* (2013.01); *G06F 17/30699* (2013.01)
(58) Field of Classification Search
CPC ................................. G06F 17/30713
USPC ........................................ 707/754
See application file for complete search history.

(56) References Cited

U.S. PATENT DOCUMENTS

| 7,124,099 | B2 | 10/2006 | Mesaros |
| 7,584,118 | B1 | 9/2009 | Bellare et al. |
| 2001/0047413 | A1 | 11/2001 | Landau et al. |
| 2002/0053078 | A1 | 5/2002 | Holtz et al. |
| 2005/0119936 | A1 | 6/2005 | Buchanan et al. |
| 2008/0140433 | A1 | 6/2008 | Levy et al. |
| 2008/0154798 | A1 | 6/2008 | Valz |
| 2009/0019375 | A1 | 1/2009 | Garofalo |
| 2009/0055242 | A1 | 2/2009 | Rewari et al. |
| 2009/0328093 | A1* | 12/2009 | Cansler ............. H04N 21/2668 725/28 |
| 2010/0063877 | A1 | 3/2010 | Soroca et al. |
| 2010/0318542 | A1* | 12/2010 | Davis ............... G06F 17/30038 707/759 |
| 2012/0239663 | A1* | 9/2012 | Tzruya ............. G06F 17/30867 707/741 |

(Continued)

OTHER PUBLICATIONS

Yalin Wang et al, "Document Zone Content Classification and its Performance Evaluation", Pattern Recognition, Jan. 31, 2006, vol. 39, Issue 1, pp. 57-73.

*Primary Examiner* — Hicham Skhoun
(74) *Attorney, Agent, or Firm* — Hayes Soloway P.C.

(57) ABSTRACT

A computer-based media content classification and discovery system includes a computerized database storing content representative identifiers corresponding to content items. Each of the content representative identifiers is keyed to a plurality of author-based, content-centered criteria elements, which are identified by an author of the each of the content items. A plurality of user computer devices is in communication with the computerized database. At least one input selection field is displayed on a GUI of the user computer devices. The input selection field has a plurality of selectable fields which matches at least one of the plurality of author-based, content-centered criteria elements. A result of the filtered selectable fields is displayed on the GUI. The result has a portion of the plurality of content items keyed to the plurality of author-based, content-centered criteria elements.

16 Claims, 5 Drawing Sheets

(56) References Cited

U.S. PATENT DOCUMENTS

2013/0103592 A1 4/2013 Shenk et al.
2013/0297581 A1* 11/2013 Ghosh ............... G06F 17/30864
　　　　　　　　　　　　　　　　　　　　707/706

* cited by examiner

A plurality of content representative identifiers may be stored on a computerized database, wherein each of the plurality of content representative identifiers corresponds to a plurality of content items, respectively, and wherein each of the plurality of content representative identifiers is keyed to a plurality of author-based, content-centered criteria elements, wherein the plurality of author-based, content-centered criteria elements are identified by an author of the each of the plurality of content items — 202

The computerized database is accessed by a user through at least one electronic communication channel — 204

The plurality of content representative identifiers are filtered, using a processor in communication with the computerized database, using at least one input selection field displayed on a graphical user interface (GUI) of a computerized device of the user, wherein the at least one input selection field has a plurality of selectable fields, wherein each of the plurality of selectable fields matches at least one of the plurality of author-based, content-centered criteria elements — 206

A result of the filtered plurality of selectable fields is displayed on the GUI of the computer device of the user — 208

COMPUTER-BASED MEDIA CONTENT CLASSIFICATION AND DISCOVERY SYSTEM AND RELATED METHODS

CROSS REFERENCE TO RELATED APPLICATION

This application claims benefit of U.S. Provisional Application Ser. No. 61/937,487 entitled, "Elements System for Content Discovery" filed Feb. 8, 2014, the entire disclosure of which is incorporated herein by reference.

FIELD OF THE DISCLOSURE

The present disclosure is generally related to content discovery, and more particularly is related to computer-based media content classification and discovery system and related method.

BACKGROUND OF THE DISCLOSURE

There exist business practices for sale of downloadable audio files, games, and other software. The Apple® App Store as a part of iTunes® is the best example of such a system. However, as these systems grow in number of applications, both customers and authors share in frustration of identifying the "good" apps. Prices are driven toward $0, as low pricing is necessary to achieve volume, and the market has become a loss leader for larger game studios to promote their titles on other platforms where they can control pricing or for independent developers who accept recognition in place of revenue.

These systems often cater to developed and well-known content providers. However, largely unknown or small content providers, such as unbranded content providers, as new entrants, face a nearly insurmountable problem having their submissions discovered by prospective customers. This shortcoming of conventional systems is largely due to the fact that a substantial portion of content is provided or marketed to prospective users is based on brand, history, or fame of the content provider. The classic solution to help prospective customers review a large number of options is to group by genre. However, this solution is also insufficient when there are thousands-to-millions of titles. While users may retrieve content that is slightly more related to his or her desires, sorting by genres provides only vague sorting. These conventional systems do not allow prospective customers to search for the particular content that would be of most interest.

Thus, a heretofore unaddressed need exists in the industry to address the aforementioned deficiencies and inadequacies.

SUMMARY OF THE DISCLOSURE

Embodiments of the present disclosure provide computer-based media content classification and discovery system. Briefly described, in architecture, one embodiment of the system, among others, can be implemented as follows. A computerized database stores a plurality of content representative identifiers, wherein each of the plurality of content representative identifiers corresponds of plurality of content items, respectively, and wherein each of the plurality of content representative identifiers is keyed to a plurality of author-based, content-centered criteria elements, wherein the plurality of author-based, content-centered criteria elements are identified by an author of the each of the plurality of content items. A plurality of user computer devices is in communication with the computerized database through at least one electronic communication channel. At least one input selection field is displayed on a graphical user interface (GUI) of at least a portion of the plurality of user computer devices, wherein the at least one input selection field has a plurality of selectable fields, wherein each of the plurality of selectable fields matches at least one of the plurality of author-based, content-centered criteria elements. A result of the filtered plurality of selectable fields is displayed on the GUI of the computer device of the user, the result having a portion of the plurality of content items keyed to the plurality of author-based, content-centered criteria elements.

The present disclosure can also be viewed as providing a computer-implemented method of media discovery. In this regard, one embodiment of such a method, among others, can be broadly summarized by the following steps: storing, on a computerized database, a plurality of content representative identifiers, wherein each of the plurality of content representative identifiers corresponds of plurality of content items, respectively, and wherein each of the plurality of content representative identifiers is keyed to a plurality of author-based, content-centered criteria elements, wherein the plurality of author-based, content-centered criteria elements are identified by an author of the each of the plurality of content items; accessing, by a user, the computerized database through at least one electronic communication channel; filtering, using a processor in communication with the computerized database, the plurality of content representative identifiers using at least one input selection field displayed on a graphical user interface (GUI) of a computerized device of the user, wherein the at least one input selection field has a plurality of selectable fields, wherein each of the plurality of selectable fields matches at least one of the plurality of author-based, content-centered criteria elements; and displaying a result of the filtered plurality of selectable fields on the GUI of the computer device of the user.

The present disclosure can also be viewed as providing a computer-implemented method of media classification. In this regard, one embodiment of such a method, among others, can be broadly summarized by the following steps: identifying, by an author of a content item, a plurality of author-based, content-centered criteria elements for the content item; keying, using a processor of a computerized device, a plurality of content representative identifiers to each of the plurality of author-based, content-centered criteria elements, whereby the content item is represented by at least one of the plurality of content representative identifiers based on the plurality of author-based, content-centered criteria elements for the content item; and storing the plurality of content representative identifiers within a computerized database accessible through at least one electronic communication channel, wherein the plurality of content representative identifiers are retrievable based on a search of at least one of the plurality of author-based, content-centered criteria elements.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
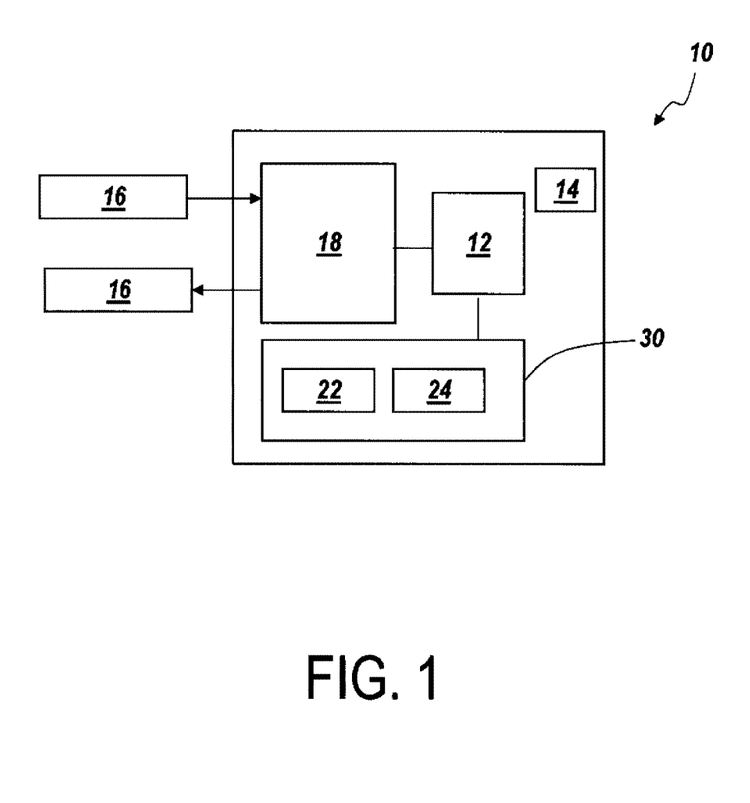
FIG. 1 is a schematic illustration of a general-purpose computer for use with the computer-based media content classification and discovery system, in accordance with a first exemplary embodiment of the present disclosure.

FIG. 1 is a schematic illustration of a general-purpose computer 10 for use with the computer-based media content classification and discovery system, in accordance with a first exemplary embodiment of the present disclosure. The general-purpose computer 10, which may be referred to simply as 'computerized device 10' or 'computer 10' herein, may include any components, in whole or in part, commonly used with a computerized device, but may also include a variety of additional components. Accordingly, the computer 10 of FIG. 1 is to provide clarity in describing the general functioning of a computing system and is not considered limiting to the present disclosure.

The computerized device 10 may include a variety of computer-based components, in whole and in part. For example, the computerized device 10 may be implemented in software (e.g., firmware), hardware, or a combination thereof. Commonly, the computerized device 10 is implemented with both hardware and software, such as a hard drive or memory that stores processor-executable code portions for carrying out instructions, calculations, or other tasks. The software or programmable code may be executed by any special or general purpose digital computer, such as a personal computer (PC; IBM-compatible, Apple-compatible, or otherwise), workstation, minicomputer, smart phone, tablet computer, or mainframe computer.

In terms of hardware architecture, as shown in FIG. 1, the computer 10 includes a processor 12, database 14, and one or more input and/or output (I/O) devices 16 (or peripherals) that are communicatively coupled via a local interface 18 (I/O interface). The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software, particularly that stored in the database 14. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., a 68xxx series microprocessor from Motorola Corporation, a Phenom II X4 975 BE from AMD, or a Pentium E5800 and/or Core I7-990X from Intel Corporation.

The database 14, which may often be referred to as 'memory,' can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the database 14 may incorporate electronic, magnetic, optical, and/or other types of storage media. Note that the database 14 can have a distributed architecture, where various components are situated remote from one another, but can be accessed by the processor 12. For example, the database 14 may have a partitioned drive for storage of data in separate and distinct areas with communication therebetween through the processor 12.

Figure 2:
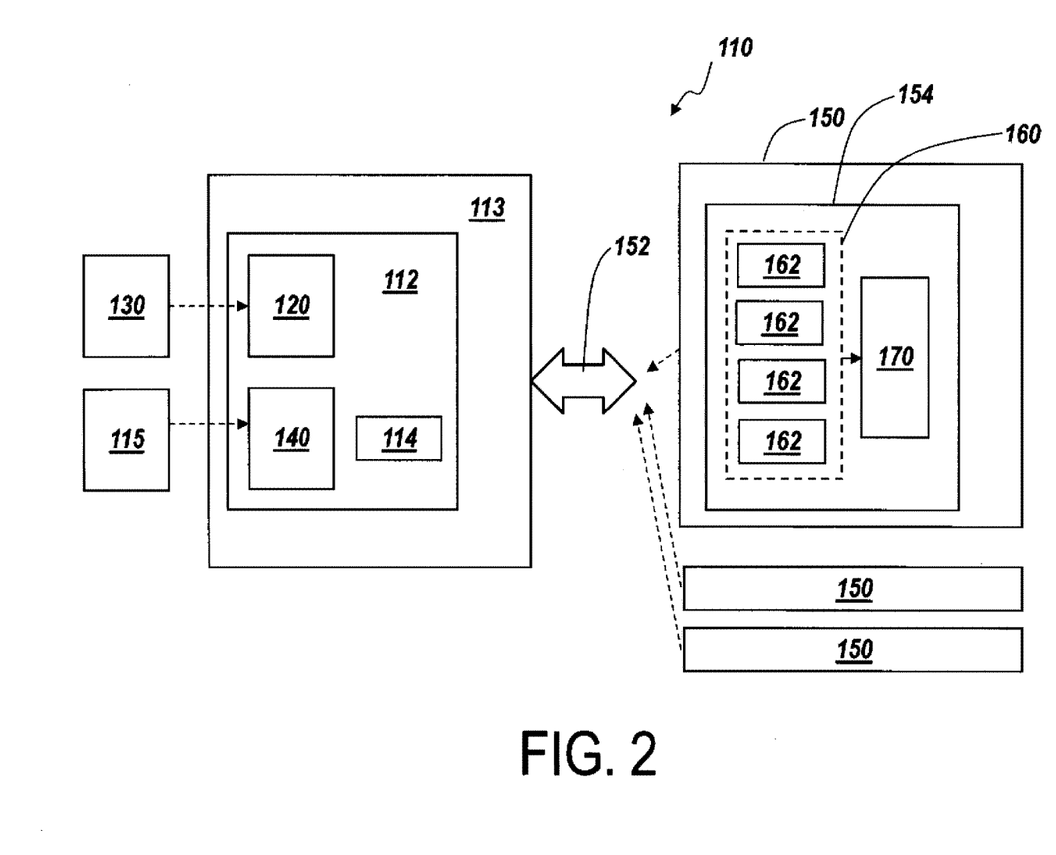
FIG. 2 is a schematic illustration of a computer-based media content classification and discovery system, in accordance with a second exemplary embodiment of the present disclosure.

The software in the database 14 may include one or more separate programs, each of which comprises an ordered listing of executable instructions for implementing logical functions. In the example of FIG. 2, the software in the database 14 may include an operating system (O/S) 22, which manages computer hardware resources and provides common services for execution of various software applications 24. A nonexhaustive list of examples of suitable commercially available operating systems 22 includes Windows operating system available from Microsoft Corporation, a Netware operating system available from Novell, Inc., a Macintosh operating system available from Apple Computer, Inc., a UNIX operating system, which is available for purchase from many vendors, such as the Hewlett-Packard Company, Sun Microsystems, Inc., and AT&T Corporation, a LINUX operating system, which is freeware that is readily available on the Internet, a run time Vxworks operating system from WindRiver Systems, Inc., and an appliance-based operating system, such as that implemented in handheld computers or personal data assistants (PDAs) (e.g., PalmOS available from Palm Computing, Inc., and Windows CE available from Microsoft Corporation), tablet computers, smart phones and other mobile computing devices.

The operating system 22 may control the execution of other computer programs, namely software applications 24, and provides scheduling, input-output control, file and data management, memory management, and communication control and related services. The software applications 24 may include any type of computer program or software that is installed, downloaded, or otherwise stored, at least in part, in the database 14. Software applications 24 may include activity or function-specific programs and general functioning programs. For example, a nonexhaustive list of software applications 24 includes programs for word processing (i.e., MS Office Suite available from the Microsoft Corporation), data-processing, image processing (i.e., Creative Suite or Adobe Reader available from Adobe Systems, Inc.), gaming, anti-virus, and communication (i.e., AOL Instant Messenger available from America On-Line), or any other software program. Additionally, it is noted that software applications 24 are commonly referred to as 'Apps.'

The software application 24 on the computer 10 may include a source program, executable program (object code), script, or any other entity comprising a set of instructions to be performed. When a source program, then the program needs to be translated via a compiler, assembler, interpreter, or the like, which may or may not be included within the memory 14, so as to operate properly in connection with the O/S 22. Furthermore, the software application 24 may be written as an object oriented programming language, which has classes of data and methods, or a procedure programming language, which has routines, subroutines, and/or functions, for example but not limited to, C, C++, Pascal, Basic, Fortran, Cobol, Perl, Java, and Ada.

The I/O devices 16 may include input devices, for example but not limited to, a keyboard, mouse, scanner, microphone, communication connection, or other computerized device, etc. Furthermore, the I/O devices 16 may also include output devices, for example but not limited to, a printer, display, etc. The I/O devices 16 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 10 is a PC, workstation, or the like, the software in the database 14 may further include a basic input output system (BIOS) (omitted for simplicity). The BIOS is a set of essential software routines that initialize and test hardware at startup, start the O/S 22, and support the transfer of data among the hardware devices. The BIOS is stored in ROM so that the BIOS can be executed when the computer 10 is activated. When the computer 10 is in operation, the processor 12 is configured to execute software stored within the database 14, to communicate data to and from the database 14, and to generally control operations of the computer 10 pursuant to the software. The O/S 22, in whole or in part, but typically the latter, are read by the processor 12, perhaps buffered within the processor 12, and then executed.

The computer 10 can include software applications 24 which can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The computer 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Alternatively, functioning of the computer 10 may be implemented in hardware, which may require any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is noted that the computer 10 may be a single unitary device having the various components housed therein, or a plurality of interconnected devices connected through a communication connection. Communication connections may include wired connections, wireless connections, connections through other devices (servers), and connections through a network. For example, a plurality of computers 10 may be connected together via a network connection such as the Internet, an extranet, or any other cloud-based network where communication is facilitated. The components of the computer 10, such as the memory 14, may be house and/or stored remote from the processor 12, or other components, and communicate through a network connection. Any configuration of the components of the computer 10 may be possible.

FIG. 2 is a schematic illustration of a computer-based media content classification and discovery system 110, in accordance with a second exemplary embodiment of the present disclosure. The computer-based media content classification and discovery system 110 having, which may be referred to herein simply as 'system 110' includes a non-transitory computerized database 112 having a plurality of instructions executable by a processor 114. The computerized database 112 stores a plurality of content representative identifiers 120, wherein each of the plurality of content representative identifiers 120 corresponds of plurality of content items 130, which may be stored within the computerized database 112 or external thereof, as depicted in FIG. 2. Each of the plurality of content representative identifiers 120 is keyed to a plurality of author-based, content-centered criteria elements 140, wherein the plurality of author-based, content-centered criteria elements 140 are identified by an author 115 of the each of the plurality of content items 130. A plurality of user computer devices 150 are in communication with the computerized database 112 through at least one electronic communication channel 152. At least one input selection field 160 displayed on a graphical user interface (GUI) 154 of at least a portion of the plurality of user computer devices 150. The at least one input selection field 160 has a plurality of selectable fields 162, wherein each of the plurality of selectable fields 162 matches at least one of the plurality of author-based, content-centered criteria elements 140. A result 170 of the filtered plurality of selectable fields 160 are displayed on the GUI 154 of the computer device 150 of the user. The result 170 has a portion of the plurality of content items 130 keyed to the plurality of author-based, content-centered criteria elements 140.

The non-transitory memory 112 having the instructions executable by the processor 114 may be enabled as a computerized device, as described relative to FIG. 1 or as is known within the art. Components of the system 110 may be housed, enabled, or operated from the non-transitory memory 112 or other memory devices or databases in other computerized devices, including remote servers and user computers 116. The system 110 may be constructed as a computerized system having a plurality of modules stored within the non-transitory memory 112. Each module may be correlated with instructions within the non-transitory memory 112, each of which may relate to a specific aspect or function of the system 110.

The system 110 may facilitate a plurality of content items 130 to be filtered and searched by users of the system 110, who may be prospective purchasers of the content items 130. The content items 130 may be housed within a database that is in communication with the system 110, such as when the content items 130 are digital, downloadable content items 130 which can be downloaded or retrieved by the user after a purchase. In this situation, the downloadable content items 130 may include any type of media, including textual media such as e-books, written articles, etc., auditory and/or visual media, such as music, videos, graphics, etc., or other types of media items. In one of many alternatives, the content items 130 may have physical items, such as books, disks, paper goods, or other items which are stored remote from the system 110 and transmitted to a user after a purchase of the content item 130. In this example, the user may identify and purchase the content item 130 on the system 110 but gain possession of the content item 130 via other means.

The plurality of content representative identifiers 120 may be any type of identifier of the content item 130 it represents. For example, the content representative identifiers 120 may include the name of the content item 130, the author, a description of the content item 130, a passage of the content item 130, or other information that helps identify the content item 130. It is noted that the content representative identifiers 120 can also be the content item 130 itself when the content item 130 is hosted or stored directly on the system 110. Each content item 130 may have a corresponding content representative identifier 120, such that each content item 130 is properly identified on the system 110.

Each of the plurality of content representative identifiers 120 is keyed to a plurality of author-based, content-centered criteria elements 140 which are identified by an author 115 of the each of the plurality of content items 130. The author-based, content-centered criteria elements 140 may include elements of the content item 130 that are determined by the author of the content item 130 itself. The author-based, content-centered criteria elements 140 may include objective aspects, characteristics, or traits of the content item 130 that describe the content item 130 or assist with understanding the actual content of the content item 130. It is preferable for the author-based, content-centered criteria elements 140 to be reportable by the author reliably and accurately without subjective information.

The number and scope of the author-based, content-centered criteria elements 140 may vary largely, and may include, for example, a target audience age, sexual content, a romance content, a humor content, a mood content, a realism content, a setting type, a time period, a mystery content, political/social commentary content, a sexual content, a language content, and a pacing of the content item. Each of the author-based, content-centered criteria elements 140 may have a finite set of possible values, such that they can be objectively derived. In some situations, the author-based, content-centered criteria elements 140 can be classified as a Top Level Genre (TLG) and a non-Top Level Genre (Non-TLG). In this situation, the TLG may include author-based, content-centered criteria elements 140 that clearly and definitely can be identified within a high-level genre. For example, classifying a romance novel with a love story as the first and foremost aspect of the content as a TLG, whereas novels with no romantic elements, minor romance that is not significant to the story, or significant romantic themes are classified as Non-TLG.

Other author-based, content-centered criteria elements 140 may include any of the following items:

| Audience & Ratings |
| --- |
| Violence |
| None |
| Minor |
| Death, but minimal violence |
| Major violence, death |
| Extreme violence, torture, maiming |
| Language |
| No profanity or censor words |
| Minor profanity used occasionally |
| Major use of profanity |
| Sexual Content |
| No sexual acts implied or described |
| Sexual acts implied but not described |
| Occasional detailed sex scene |
| Erotica - frequent detailed sex |
| Pornography - frequent detailed sex with detailed descriptions of acts and body parts |
| Target Audience Age |
| Everyone (no target age) |
| 0-2 |
| 3-5 |
| 6-8 |
| 9-12 Tween |
| 13-17 Young adult |
| 18-34 New adult/twentysomethings |
| 35-64 Working age adults |
| 65+ Senior |
| 18+ Adult only, inappropriate for children |

| Setting | |
| --- | --- |
| Time Period | Geography |
| Prehistoric | Setting Type |
| Pre-Classical (10,000BC-1,000BC) | Fantasy |
| Classical (1,000BC-400CE) | On or underwater/Nautical |
| Dark Ages (400CE-1000CE) | Pastoral (rural & small towns) |
| Pre-Renaissance (1000CE-1300CE) | Dystopic/Post-Apocalyptic |
| 1300-1500 | Wilderness/Desert/Other outdoors |

| Setting | |
|---|---|
| 1500-1600 | Space |
| 1600-1700 | Underground |
| 1700-1800 | Urban (city) |
| 1800-1900 | Realism |
| 1900-1950 | A true story to the best of the author's knowledge |
| 1950-1960 | |
| 1960-1970 | Consistent with real world, no magic, no unachieved science |
| 1970-1980 | |
| 1980-1990 | World is similar to ours, but plot elements exceed our current tech level |
| 1990-2000 | |
| 2000-2010 | World is similar to ours, but plot elements involve fantasy or magic |
| 2010-2020 (Present day) | |
| 2020-2030 | Science stretched but possible (possible science of the near future) |
| 2030-2050 | |
| 2050-2100 | Science of far future, attempts for rigorous accuracy |
| 2100-2200 | |
| 2200-3000 | Science well beyond modern definitions, bordering on fantasy |
| Far Future (3000+) | |
| N/A | Fantasy world with low or no magic |
| | Fantasy world where magic is prevalent |

| Styles & Themes |
|---|
| Physical Action |
| Negligible physical action |
| Minor and occasional action |
| Sports-based action |
| Nature-based survival action |
| Frequent action, driven by threat to safety or life by antagonist(s) |
| Pacing |
| Time to savor, deliberate |
| Moves quickly |
| Breakneck |
| Romance |
| No romantic elements |
| Minor romance, not a significant story driver |
| Significant romantic themes |
| Major romance, essential to story |
| A Love story first and foremost |
| Mysteries & Puzzles |
| None or only very minor mysteries |
| Modest mystery element(s) to story |
| Significant mystery(ies) are core to driving the story |
| Thought-provoking puzzles tangentially related to story |
| Puzzles or clues that reader could use to solve mystery(ies) of story |
| Humor |
| Serious |
| Moments of levity |
| Dark humor |
| Humor throughout |
| Laughs take priority over all else |
| Political/Social Commentary |
| Politics irrelevant to story |
| Politics play a minor role |
| Heavy use of social and political themes on a personal level |
| Geopolitical factors major theme at an international level |
| Story includes metaphors for social or political theme(s) |
| Story is intended as metaphor for social or political theme(s) |
| Inspires Reader to Feel . . . |
| Uneasy/Tense |
| Fear/Horror |
| Sad |
| Confused/Questioning |
| Spiritual |
| Confident/Self-Motivated |
| Politically or Socially Motivated |
| Romantic |

| Styles & Themes |
|---|
| Nostalgic/Happy |
| N/A or None of the above |

| Main Character | |
|---|---|
| Gender | Sexual Preference |
| Female | Irrelevant or N/A |
| Male | — |
| Transgender | Heterosexual |
| — | Homosexual |
| Other or N/A | Bisexual |
| Age | Other |
| Baby | Religion |
| Toddler | Irrelevant |
| Young Child | — |
| Child | Agnostic/Atheist |
| Tween | Amish & Mennonite |
| Teen | Baha'i |
| Young Adult | Buddhist |
| Adult | Christian |
| Middle-aged | Druid |
| Senior | Hindi |
| — | Jewish |
| Other or N/A | Muslim |
| Race | Other |
| Irrelevant | Rastafarian |
| — | Satanist |
| Aboriginal Australian | Scientologist |
| Arab, Semitic, Middle Eastern | Shinto |
| Asian | Sikh |
| Bengali, Indian, Dravidian, Indo-Aryan | Unitarian |
| Caucasian European | Wiccan |
| Latin American | — |
| Native American | Fictional Monotheistic Religion |
| North African | Fictional Polytheistic Religion |
| Pashtun, Iranian, Afghani, Pakistani | Alien Religion |
| Sub-Saharan African | |
| Alien | |
| Animal | |
| Deity | |
| Machine/Cyborg | |
| Mutant | |
| Supernatural | |
| Undead (Vampire, Zombie, Ghost, etc.) | |

The above-provided author-based, content-centered criteria elements 140 may be, for example, use to describe books. In this example, it can be seen that the author-based, content-centered criteria elements 140 may be far more descriptive than mere genres or top-level classifications of books. Accordingly, the author-based, content-centered criteria elements 140 may be characterized as content-based elements or aspects of the content items 130 that provided descriptive indicators of the content of the content item 130 beyond a general classification or genre of the content item 130. It is further noted that the author-based, content-centered criteria elements 140 may include, in some circumstances, author-based, subjective, content-centered criteria elements. For example, these author-based, subjective, content-centered criteria elements may include items that are subjectively provided, such as a user inspiration feeling, e.g., makes the user feel good, character development, e.g., character experiences social growth and awareness, rememberability of the content items, e.g., the "tune stays in your head" (for musical content items), among other, subjective criteria. Normally, the values can of these subjective, content-centered criteria elements are only set by other content consumers, not by the content creator, due to the fact that content creators (authors) are likely to perceive their own content items 130 as better than it may be. These subjective, content-centered criteria elements are subjective and can't generally set reliably by the content creator, but in some cases may find uses in the system 110.

The plurality of user computer devices 150 may include any type of computerized device, such as a personal computer, a smart phone, a tablet computer, or any others. The electronic communication channel 152 may include any type of electronic communication, such as a network connection, WiFi, etc. Once the user connects to the system 110, he or she may access the system 110 via a computer program of website hosting an application. Once the user is ready to use the system 110, at least one input selection field 160 is displayed on a GUI of the user computer device 150.

The at least one input selection field 160 may be a type of computerized menu which allows the user to appropriate use the system 110. For example, the menu may include a nester tree menu which displays options to the user based on a hierarchy of the menu item, e.g., the selectable fields 162. The plurality of selectable fields 162 match at least one of the plurality of author-based, content-centered criteria elements 140, such that selecting one of the plurality of selectable fields 162 indicates a selection of one of the author-based, content-centered criteria elements 140. In this way, the user can successfully navigate the system 110 to filter the content items 130.

After filtering, a result 170 of the filtered plurality of selectable fields 160 is displayed on the GUI 154 of the computer device 150 of the user. The result 170 has a portion of the plurality of content items 130 keyed to the plurality of author-based, content-centered criteria elements 140. In the example using books as the content items 130, the result may include a list of the books that match the selectable fields 162 selected by the user. The result 170 may include other information about the book, too, including an image of its cover, a price, and a link to purchasing the book. The result 170 of the filtered plurality of selectable fields can be saved and a name can be identified to the saved result 170, such that the user can retrieve the same result 170 at a later point of time.

Further, in some uses of the system 110, a point value is assigned to each of the plurality of filtered, author-based, content-centered criteria elements 140, and a portion of the content items having the filtered, author-based, content-centered criteria elements 140 can be ranked with one another. Content items 130 not having the filtered, author-based, content-centered criteria elements 140 are omitted from ranking, thereby allowing the ranking to provide accurate results to the user. Specifically, content items 130 may be divided into smaller groups based on the filtered, author-based, content-centered criteria elements 140 for rankings, so that books of very different types are not ranked with each other. This type of ranking may prevent, for example, a book on picking up the pieces after having been in a concentration camp during WW II from being ranked to or compared with teen vampire romance stories, since it is likely that the least popular vampire romance could still be more popular than the most popular post-WW II book. Thus, the system 110 facilitates comparison of content items that have similar features.

Figure 3:
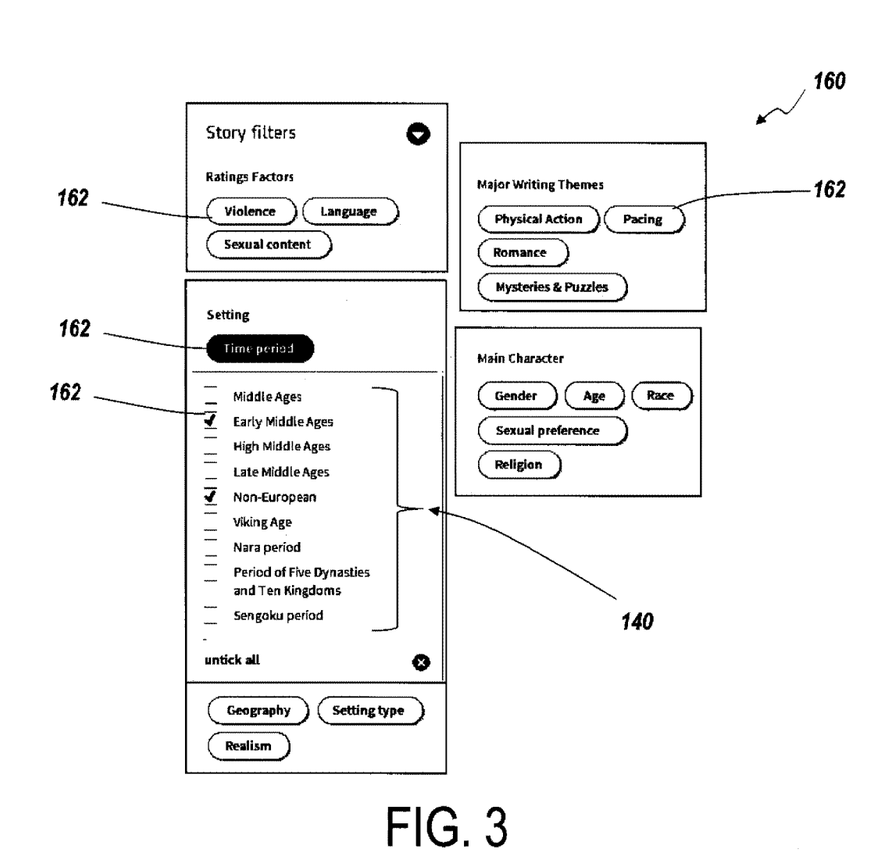
FIG. 3 is a diagrammatical illustration of an input selection field having a plurality of selectable fields which are keyed to the plurality of author-based, content-centered criteria elements for use with the computer-based media content classification and discovery system of FIG. 2.

FIG. 3 is a diagrammatical illustration of an input selection field 160 having a plurality of selectable fields 162 which are keyed to the plurality of author-based, content-centered criteria elements 140 for use with the computer-based media content classification and discovery system 110 of FIG. 2. Relative FIGS. 2-3, the input selection field 160 has selectable fields 162 which are illustrated as selection buttons that are labeled with or near the author-based, content-centered criteria elements 140. In selecting the selectable fields 162, the user may encounter narrowing selectable fields 162. For example, when selectable field 162 marked 'Time period' is selected, the user may then need to select what specific (or general) time period they wish to filter the author-based, content-centered criteria elements 140 by. Once the desired selectable fields 162 are selected, the filtering may retrieve all possible content items 130 which match the selectable fields 162 selected to produce the result 170. If there is a content item 130 that falls outside the selectable fields 162 selected by the user, it may be omitted from the results 170.

It is further noted that users (content consumers) can select one or more selectable fields 162 for each of the author-based, content-centered criteria elements 140. The system 110 will then show all content with matching author-based, content-centered criteria elements 140. Additionally, the system 110 can notify user automatically if new content item 130 is added that matches these search criteria. The user can select which saved author-based, content-centered criteria elements 140 set to use through a drop down, radio button, or other standard selection method. The user can also select an existing title of a content item 130 on the system 110 and add that to his or her list of author-based, content-centered criteria elements 140 searches. It is noted that a user can also require an exact match, or accept that 1 or more of the author-based, content-centered criteria elements 140 don't match. Search results can be set to group results by the number of matching author-based, content-centered criteria elements 140.

Figure 4:
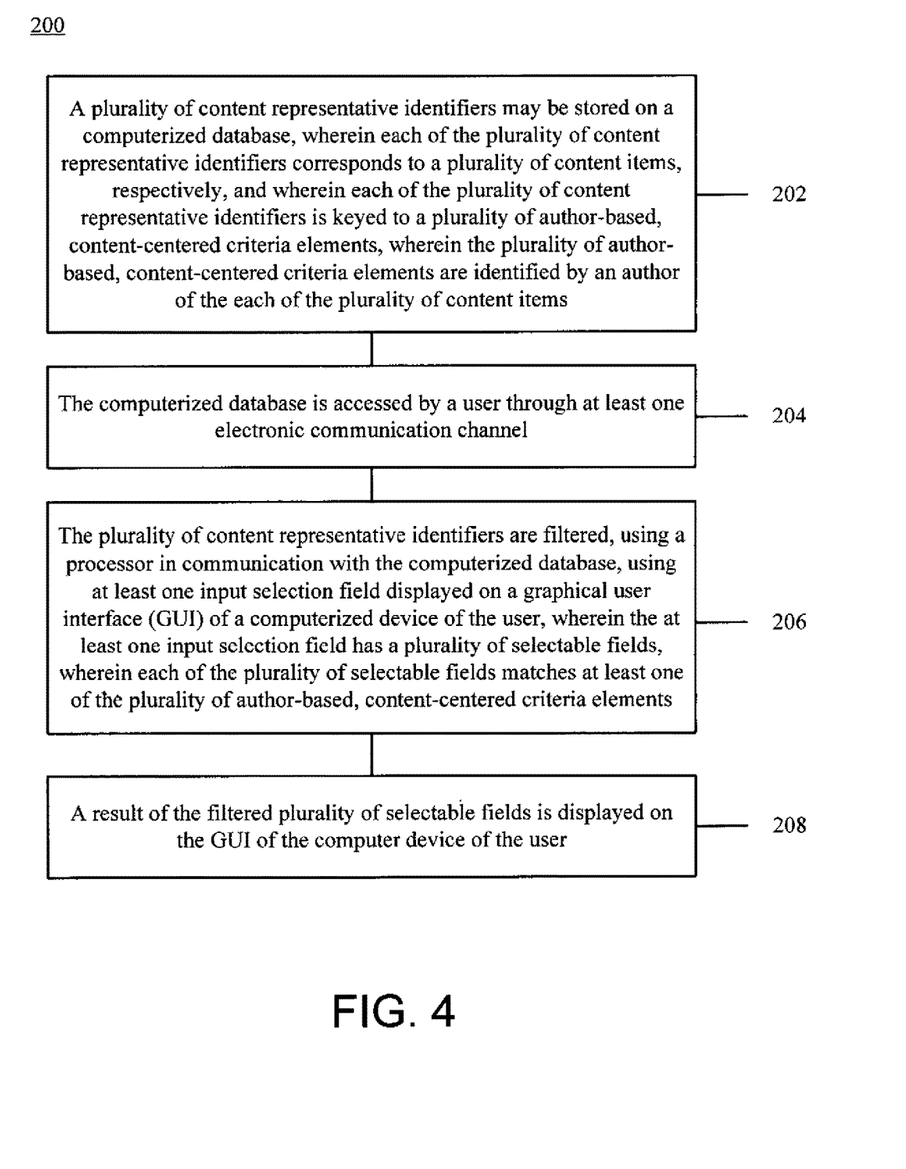
FIG. 4 is a flowchart illustrating a computer-implemented method of media discovery, in accordance with a third exemplary embodiment of the disclosure.

FIG. 4 is a flowchart 200 illustrating a computer-implemented method of media discovery, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown in block 202, a plurality of content representative identifiers may be stored on a computerized database, wherein each of the plurality of content representative identifiers corresponds to a plurality of content items, respectively, and wherein each of the plurality of content representative identifiers is keyed to a plurality of author-based, content-centered criteria elements, wherein the plurality of author-based, content-centered criteria elements are identified by an author of the each of the plurality of content items. The computerized database is accessed by a user through at least one electronic communication channel (block 204). The plurality of content representative identifiers are filtered, using a processor in communication with the computerized database, using at least one input selection field displayed on a graphical user interface (GUI) of a computerized device of the user, wherein the at least one input selection field has a plurality of selectable fields, wherein each of the plurality of selectable fields matches at least one of the plurality of author-based, content-centered criteria elements (block 206). A result of the filtered plurality of selectable fields is displayed on the GUI of the computer device of the user (block 208). The method may further include a plurality of other steps, processes, and functions, including any disclosed relative to any other figure within this disclosure.

Figure 5:
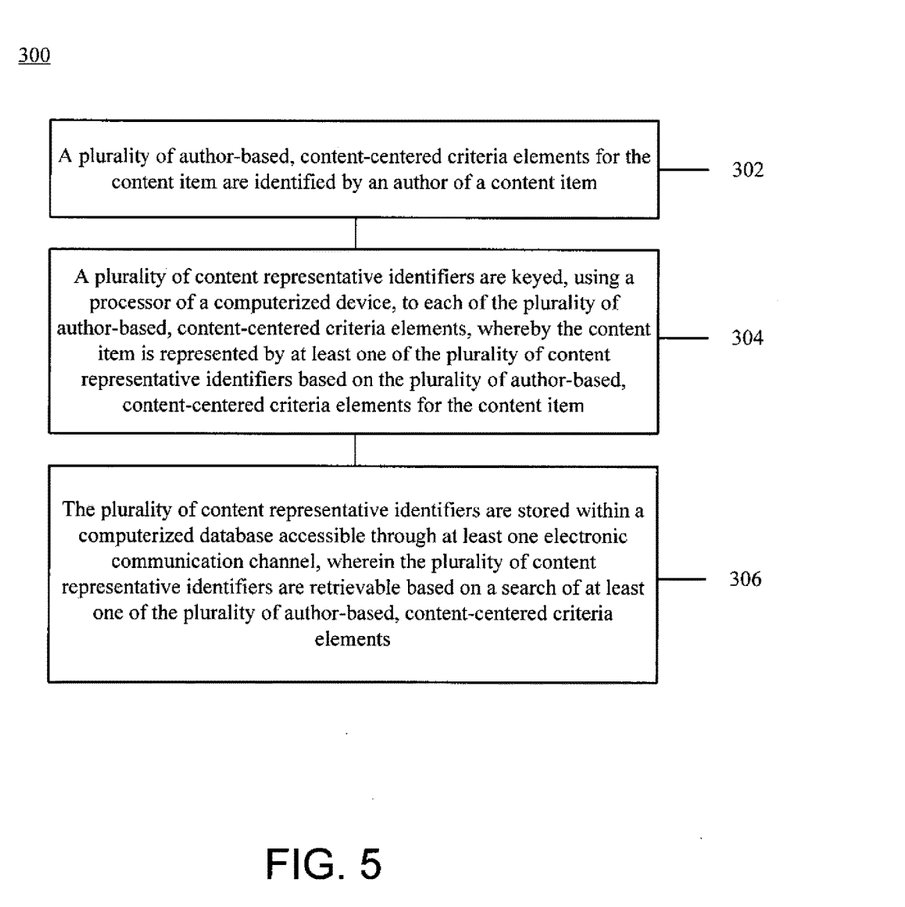
FIG. 5 is a flowchart illustrating a computer-implemented method of media classification, in accordance with a third exemplary embodiment of the disclosure.

FIG. 5 is a flowchart 300 illustrating a computer-implemented method of media classification, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown in block 302, a plurality of author-based, content-centered criteria elements for the content item are identified by an author of a content item. A plurality of content representative identifiers are keyed, using a processor of a computerized device, to each of the plurality of author-based, content-centered criteria elements, whereby the content item is represented by at least one of the plurality of content representative identifiers based on the plurality of author-based, content-centered criteria elements for the content item (block 304). The plurality of content representative identifiers are stored within a computerized database accessible through at least one electronic communication channel, wherein the plurality of content representative identifiers are retrievable based on a search of at least one of the plurality of author-based, content-centered criteria elements (block 206). The method may further include a plurality of other steps, processes, and functions, including any disclosed relative to any other figure within this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An e-book media content classification and discovery method comprising the steps of:
   providing a plurality of e-book files;
   associating a plurality of content representative identifiers with each of the e-book files, wherein each of the plurality of content representative identifiers corresponds to at least one of a plurality of author-based, content-centered literary criteria elements assigned within literary criteria categories, wherein the plurality of author-based, content-centered literary criteria elements are identified by an author of the each of the plurality of e-book files, respectively, wherein the literary criteria categories comprise: a rating factor of the e-book file; a setting of the e-book file; a style of the e-book file; a theme of the e-book file; and a main character characteristic of the e-book file;
      wherein author-based, content-centered literary criteria elements of the rating factor of the e-book file comprise: violence, language, sexual content, and target audience,
      wherein author-based, content-centered literary criteria elements of the setting of the e-book file comprise: time period, setting type, and realism,
      wherein author-based, content center literary criteria elements of at least one of the style of the e-book file and the theme of the e-book file comprise: physical action, pacing, romance, mysteries and puzzles, humor, inspiration of reader, and political and social commentary,
      wherein author-based, content centered literary criteria elements of the main character characteristic of the e-book file comprise: gender, age, race, sexual preference, and religion;
   determining a user selection of at least one of a plurality of selectable fields based on a selection of the literary criteria categories and the author-based, content-centered literary criteria elements thereof, using at least one input selection field displayed on a graphical user interface (GUI) of a computerized device of the user, wherein the at least one input selection field has the plurality of selectable fields, wherein each of the plurality of selectable fields matches at least one of the plurality of author-based, content-centered criteria elements;
   filtering the author-based, content-centered literary criteria elements based on the determined user selection, whereby author-based, content-centered literary criteria elements matching the determined user selection are populated in a results list and author-based, content-centered literary criteria elements not matching the determined user selection are omitted from populated results list;
   filtering the e-book files based on the filtered author-based, content-centered literary criteria elements;
   assigning a point value to each of the filtered author-based, content-centered literary criteria elements;
   ranking, based on the point value, the plurality of e-book files having the filtered author-based, content-centered literary criteria elements within one of the literary criteria categories against all other e-book files within that literary criteria category, wherein e-book files in different literary criteria categories are not ranked against each other;

displaying a result of the filtered plurality of selectable fields on the GUI of the computer device of the user, wherein the result has at least a portion of the plurality of e-book files keyed to the plurality of author-based, content-centered literary criteria elements; and saving the result of the filtered plurality of selectable fields and associating a name with the saved result, enabling the user to retrieve the same result at a later point of time.

2. The method of claim 1, wherein each of the author-based, content-centered literary criteria elements are made objectively by the author.

3. The method of claim 1, wherein the author-based, content-centered literary criteria elements are made both objectively and subjectively by the author.

4. The method of claim 1, wherein each of the literary criteria categories are visible as separated blocks of a selection menu of a GUI.

5. The method of claim 4, wherein each of the author-based, content-centered literary criteria elements of the literary criteria categories are visible as selectable fields within the separated blocks of the selection menu of the GUI.

6. The method of claim 5, wherein each of the author-based, content-centered literary criteria elements of the literary criteria categories further comprises a plurality of literary descriptors of the e-book files, each of the literary descriptors being selectable by the user after selection of the author-based, content-centered literary criteria element.

7. The method of claim 1, wherein each of the author-based, content-centered literary criteria elements is classified as one of: a Top Level Genre (TLG) and a non-Top Level Genre (Non-TLG).

8. The method of claim 1, wherein each of the author-based, content-centered literary criteria elements has a finite set of possible values.

9. A system for e-book media content classification and discovery comprising:

a plurality of e-book files;

a plurality of content representative identifiers associated with each of the e-book files, wherein each of the plurality of content representative identifiers corresponds to at least one of a plurality of author-based, content-centered literary criteria elements assigned within literary criteria categories, wherein the plurality of author-based, content-centered literary criteria elements are identified by an author of the each of the plurality of e-book files, respectively, wherein the literary criteria categories comprise: a rating factor of the e-book file; a setting of the e-book file; a style of the e-book file; a theme of the e-book file; and a main character characteristic of the e-book file;

wherein author-based, content-centered literary criteria elements of the rating factor of the e-book file comprise: violence, language, sexual content, and target audience, wherein author-based, content-centered literary criteria elements of the setting of the e-book file comprise: time period, setting type, and realism, wherein author-based, content center literary criteria elements of at least one of the style of the e-book file and the theme of the e-book file comprise: physical action, pacing, romance, mysteries and puzzles, humor, inspiration of reader, and political and social commentary, wherein author-based, content centered literary criteria elements of the main character characteristic of the e-book file comprise: gender, age, race, sexual preference, and religion;

determining by a hardware processor a user selection of at least one of a plurality of selectable fields determined based on a selection of the literary criteria categories and the author-based, content-centered literary criteria elements thereof, using at least one input selection field displayed on a graphical user interface (GUI) of a computerized device of a user, wherein the at least one input selection field has the plurality of selectable fields, wherein each of the plurality of selectable fields matches at least one of the plurality of author-based, content-centered criteria elements;

filtering by the hardware processor the author-based, content-centered literary criteria elements based on the determined user selection, whereby author-based, content-centered literary criteria elements matching the determined user selection are populated in a results list and author-based, content-centered literary criteria elements not matching the determined user selection are omitted from the populated results list;

filtering by the hardware processor the e-book files based on the filtered author-based, content-centered literary criteria elements;

assigning by the hardware processor a point value to each of the filtered author-based, content-centered literary criteria elements;

ranking by the hardware processor, based on the point value, the plurality of e-book files having the filtered author-based, content-centered literary criteria elements within one of the literary criteria categories against all other e-book files within that literary criteria category, wherein e-book files in different literary criteria categories are not ranked against each other;

displaying by the hardware processor a result of the filtered plurality of selectable fields on the GUI of the computer device of the user, wherein the result has at least a portion of the plurality of e-book files keyed to the plurality of author-based, content-centered literary criteria elements; and saving by the hardware processor the result of the filtered plurality of selectable fields and associating a name with the saved result, enabling the user to retrieve the same result at a later point of time.

10. The system of claim 9, wherein each of the author-based, content-centered literary criteria elements are made objectively by the author.

11. The system of claim 9, wherein the author-based, content-centered literary criteria elements are made both objectively and subjectively by the author.

12. The system of claim 9, wherein each of the literary criteria categories are visible as separated blocks of a selection menu of a GUI.

13. The system of claim 12, wherein each of the author-based, content-centered literary criteria elements of the literary criteria categories are visible as selectable fields within the separated blocks of the selection menu of the GUI.

14. The system of claim 13, a wherein each of the author-based, content-centered literary criteria elements of the literary criteria categories further comprises a plurality of literary descriptors of the e-book files, each of the literary descriptors being selectable by the user after selection of the author-based, content-centered literary criteria element.

15. The system of claim 9, wherein each of the author-based, content-centered literary criteria elements is classified as one of: a Top Level Genre (TLG) and a non-Top Level Genre (Non-TLG).

16. The system of claim 9, wherein each of the author-based, content-centered literary criteria elements has a finite set of possible values.

\* \* \* \* \*